(12) United States Patent
Drees

(10) Patent No.: US 7,398,585 B2
(45) Date of Patent: Jul. 15, 2008

(54) METHOD FOR MANUFACTURING AN INTERNAL CORE FOR INJECTION MOLD TOOL

(75) Inventor: Guido Drees, Lubbecke (DE)

(73) Assignee: Nokia Corporation, Espoo (FI)

( * ) Notice: Subject to any disclaimer, the term of this patent is extended or adjusted under 35 U.S.C. 154(b) by 268 days.

(21) Appl. No.: 11/122,885

(22) Filed: May 4, 2005

(65) Prior Publication Data

US 2006/0249871 A1    Nov. 9, 2006

(51) Int. Cl.
  *B23P 17/00*   (2006.01)
  *B23P 13/04*   (2006.01)
  *B29C 45/00*   (2006.01)

(52) U.S. Cl. .............................. 29/412; 29/416; 29/463; 29/557; 29/558; 425/542; 700/95; 700/117

(58) Field of Classification Search ................... 29/412, 29/413, 414, 415, 445, 525.01, 525.11, 557, 29/558; 425/577, 542; 700/95, 97, 117, 700/118, 159
See application file for complete search history.

(56) References Cited

U.S. PATENT DOCUMENTS

| 4,364,160 A | * | 12/1982 | Eiswerth et al. ......... 29/889.721 |
| 4,559,684 A | * | 12/1985 | Pryor ....................... 29/888.06 |
| 5,369,870 A | * | 12/1994 | Ouchi et al. ................... 29/558 |
| 5,449,282 A | * | 9/1995 | Brown et al. ................. 425/190 |
| 5,711,074 A | * | 1/1998 | Harimoto et al. ....... 29/898.066 |

* cited by examiner

*Primary Examiner*—Jermie E Cozart
(74) *Attorney, Agent, or Firm*—Ware, Fressola, Van Der Sluys & Adolphson LLP

(57) ABSTRACT

An internal core is separated along a horizontal plane delineated at the transition point between the tapered wall portion and the parallel wall portion of the core to divide the core into a tapered wall component part manufactured by a WEDM process to obtain the desired shape and configuration and a parallel wall component part manufactured by a right angle milling or WEDM with a right angle manufacturing process to obtain the desired shape and configuration. The tapered and parallel wall component parts are joined together to form the desired internal core.

8 Claims, 3 Drawing Sheets

METHOD FOR MANUFACTURING AN INTERNAL CORE FOR INJECTION MOLD TOOL

TECHNICAL FIELD

The present invention relates generally to injection molding and deals more particularly with internal cores for injection mold tools and more specifically with the construction and manufacture of such internal cores.

BACKGROUND OF THE INVENTION

It is known in injection molding to utilize an internal core in the mold tool to achieve the desired shape and configuration of a part made with the injection molding process. The manufacturing of the internal core is a highly complex and relatively expensive process. The core is typically designed as one piece with a large height to accommodate steps in the depth of the core profile to create the functional stops for moving tool elements in the injection mold tool. The functional stops and operation of moving tool elements with the core are used to create the desired undercuts and angles of the injection molded part and are well known and understood in the art. In order to achieve the desired profile of the one-piece internal core, a combination of manufacturing processes are used. Such used manufacturing processes are for example wire cutting such as wire electric discharge machining (WEDM) and electric discharge machining (EDM) which are well known and understood to those skilled in the art. The manufacture of the one piece internal core is accomplished with two production processes in a sequential fashion such as for example WEDM for tapered portions of the core and conventional milling or EDM at right angles to the main axis of the core for the relatively parallel portions of the internal core. The manufacture of large height internal cores is not satisfactory due to the complexity and expense associated with the multiple combination of manufacturing processes that are carried out on the core stock to achieve the desired internal core shape and configuration.

Accordingly, it is an object of the present invention to provide an internal core that overcomes the drawbacks and disadvantages associated with the manufacture of prior art internal cores.

SUMMARY OF THE INVENTION

In accordance with a broad aspect of the invention, a method for manufacturing an internal core for an injection mold tool wherein the profile of the internal core has a tapered wall portion and a parallel wall portion is presented. The method includes determining a delineation line separating the tapered wall portion from the parallel wall portion to divide the internal core into a tapered wall component part and a parallel wall component part. The delineation line is along a horizontal plane dividing the tapered wall portion and the parallel wall portion. The tapered wall component part is manufactured using a WEDM manufacturing process to produce the desired shape and configuration. The parallel wall component part is manufactured using a right angle manufacturing process for example, a milling process or a WEDM process with a right angle, to produce the desired shape and configuration. The tapered wall component part and the parallel wall component part are then joined together using any suitable attachment method, for example by screwing together, to form the desired internal core. The tapered wall and parallel wall component parts are aligned prior to joining together and may be configured with alignment pins.

In accordance with a second aspect of the invention, an internal core for an injection mold tool is presented. The internal core includes a tapered wall portion and a parallel wall portion dividing the internal core horizontally along a plane passing through the internal core at a delineation line separating the tapered wall portion from the parallel wall portion. The tapered wall portion and the parallel wall portion are further manufactured to define a tapered wall component part and a parallel wall component part, respectively, each having a desired shape and configuration. Attachment means join the tapered wall component part and the parallel wall component part along the delineation line to define the internal core. The tapered wall component part is shaped and configured with a WEDM manufacturing process and the parallel wall component part is shaped and configured with a milling process or with a WEDM process with a right angle.

WRITTEN DESCRIPTION OF PREFERRED EMBODIMENTS

Figure 1:
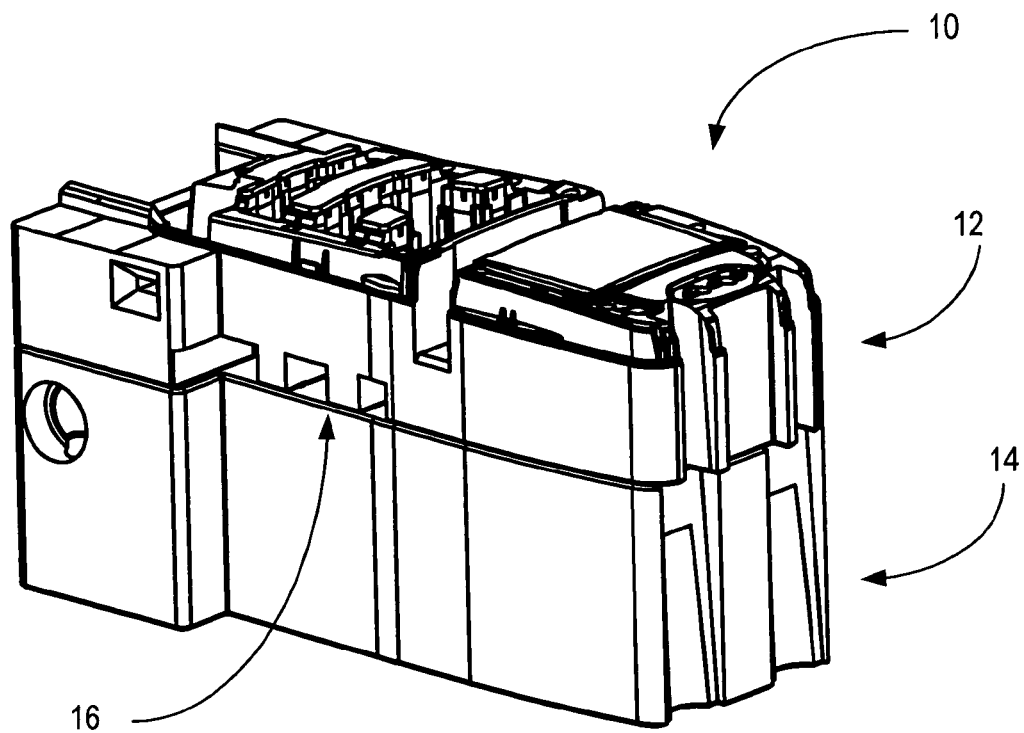
FIG. 1 is a perspective view of an internal core embodying the present invention.
Figure 2:
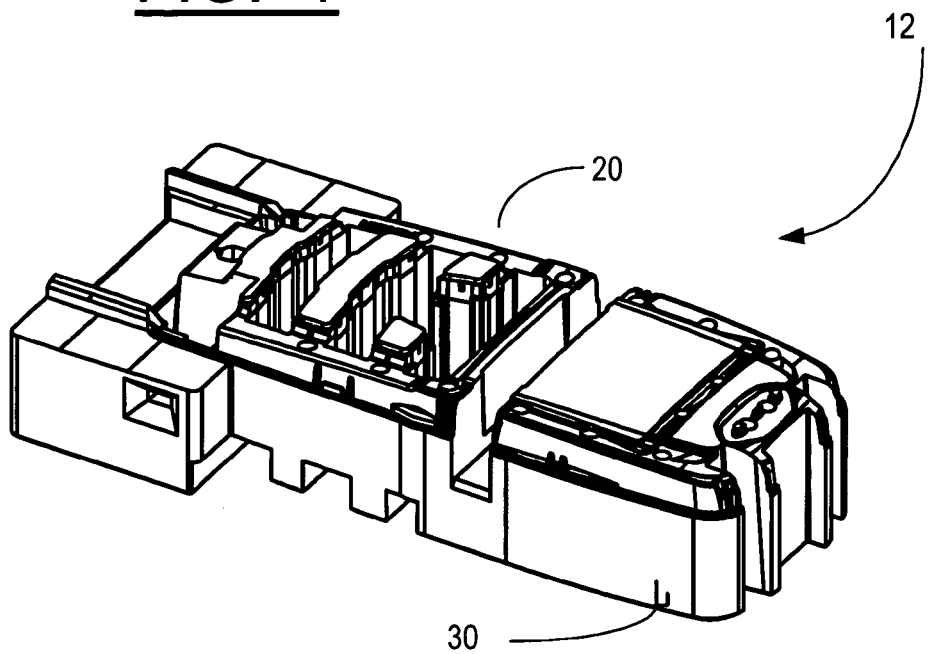
FIG. 2 is a perspective view of the tapered wall component part of the internal core illustrated in FIG. 1.
Figure 3:
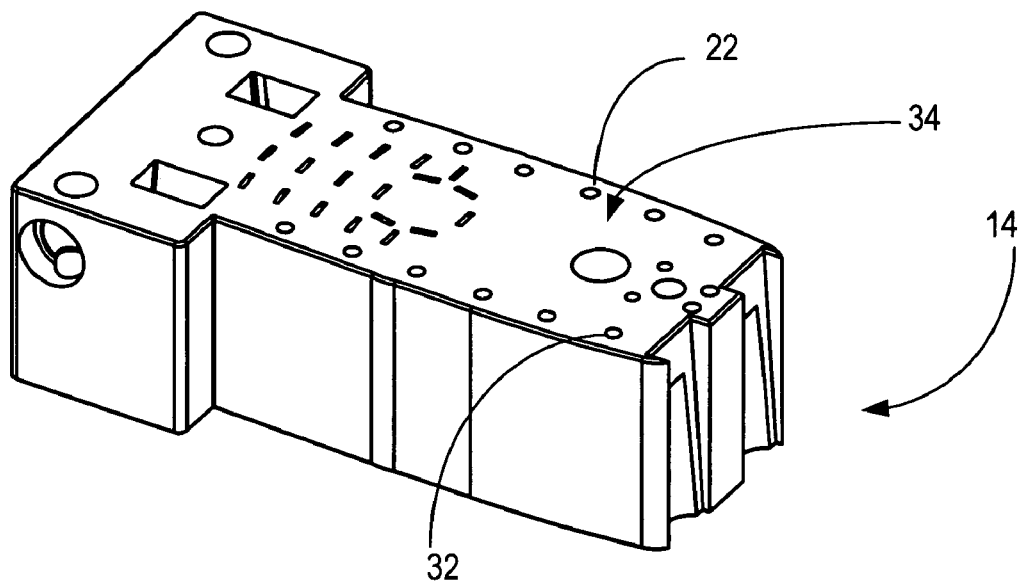
FIG. 3 is a perspective view of the parallel wall component part of the internal core illustrated in FIG. 1.

Turning now to the drawings and considering the invention in further detail, an internal core manufactured in accordance with the present invention is illustrated therein and generally designated 10. Typically, such an internal core 10 comprises an upper portion generally designated 12 which is also illustrated in FIG. 2 and a lower portion generally designated 14 which is illustrated in FIG. 3. The profile of the upper portion 12 typically is comprised of tapered wall portions as well known and understood by those skilled in the art. The lower portion 14 typically has a parallel wall profile as is also well known to those skilled in the art. Accordingly, the internal core profile transitions from a tapered wall section to a parallel wall section.

In accordance with the present invention, the internal core 10 is divided into two component parts or portions 12, 14, also referred to herein as the tapered wall component part and the parallel wall component part respectively, at the point of a delineation line 16 and which point is defined where the profile changes from a tapered wall section to a parallel wall section. The core 10 is thus divided horizontally along a plane coinciding with the delineation line 16 to define the two component parts. Obviously, the parts at this stage in the process are the stock material parts from which the internal core is made.

The tapered wall component part 12 is preferably configured using a wire electric discharge machining (WEDM) process and the parallel wall component part 14 is manufactured using a right angle milling process or a WEDM with a right angle manufacturing process. The advantage gained from manufacturing the component parts in this manner is that the parts may be made with larger tolerances and thus the manufacturing process is easier and less costly. Accordingly, the present invention provides an advantage over the prior art by providing the ability to make each of the two component parts from simplified manufacturing processes in comparison to the processes required for manufacturing a single component internal core. A further advantage is realized from the reduced manufacturing time for the internal core since each of the component parts are made at the same time and therefore reduces the overall time to manufacture and assemble the internal core is reduced.

The tapered wall component part 12 and the parallel wall component part 14 are joined together during the mold tool assembly to form the internal core 10. The two component parts are joined together using screws to attach the tapered wall component part to the parallel wall component part utilizing suitable screw holes or apertures 20 and which screws are threaded into aligned receiving holes 22 in the parallel wall component part 14. Alternately, the screws or fasteners may be inserted through the parallel wall component wall part and screwed into the tapered wall component part. The tapered wall component part and parallel wall component part are also configured with alignment pins to properly locate and align the two component parts prior to their final joining together and attachment. Alignment pins and their usage are well known to those skilled in the art and a representative alignment pin 30 is illustrated in the tapered wall component part 12 shown in FIG. 2 for alignment and receipt into a mating alignment hole 32 located in the surface 34 of the parallel plate component part 14 as illustrated in FIG. 3.

Figure 4:
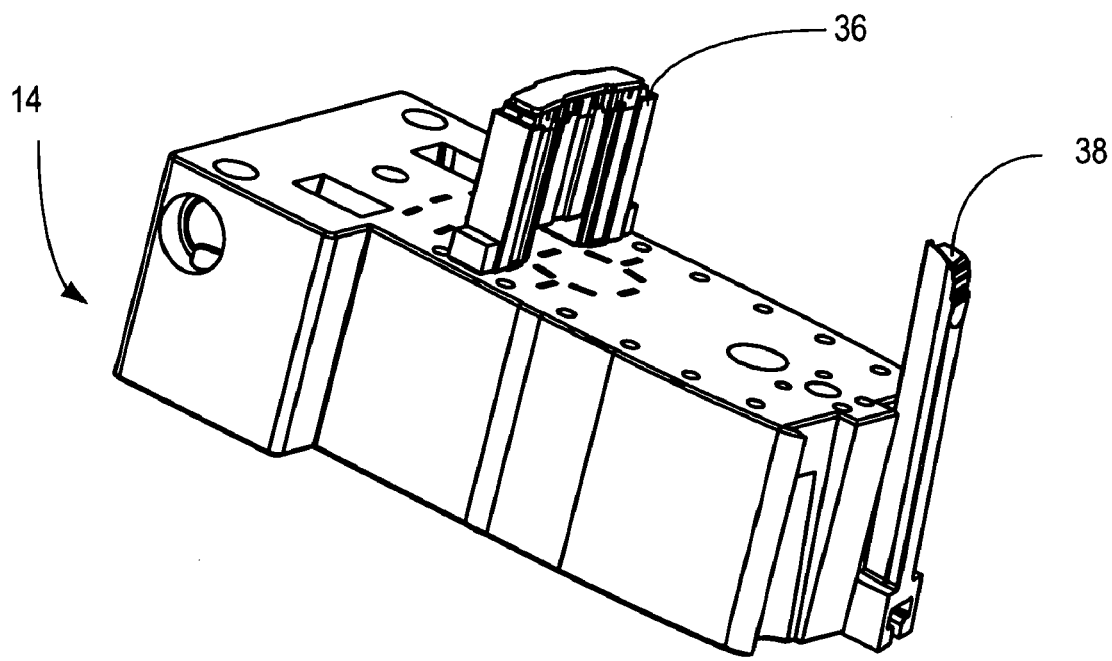
FIG. 4 is a perspective view of the parallel wall component part of FIG. 3 shown with typical slider and core moving tool elements.

The parallel wall component part 14 of the internal core 10 is suitably arranged and configured to receive a typical slider moving tool element 36 and core moving element 38 as illustrated in FIG. 4 and which core moving elements are well-known and understood by those skilled in the art.

Figure 5:
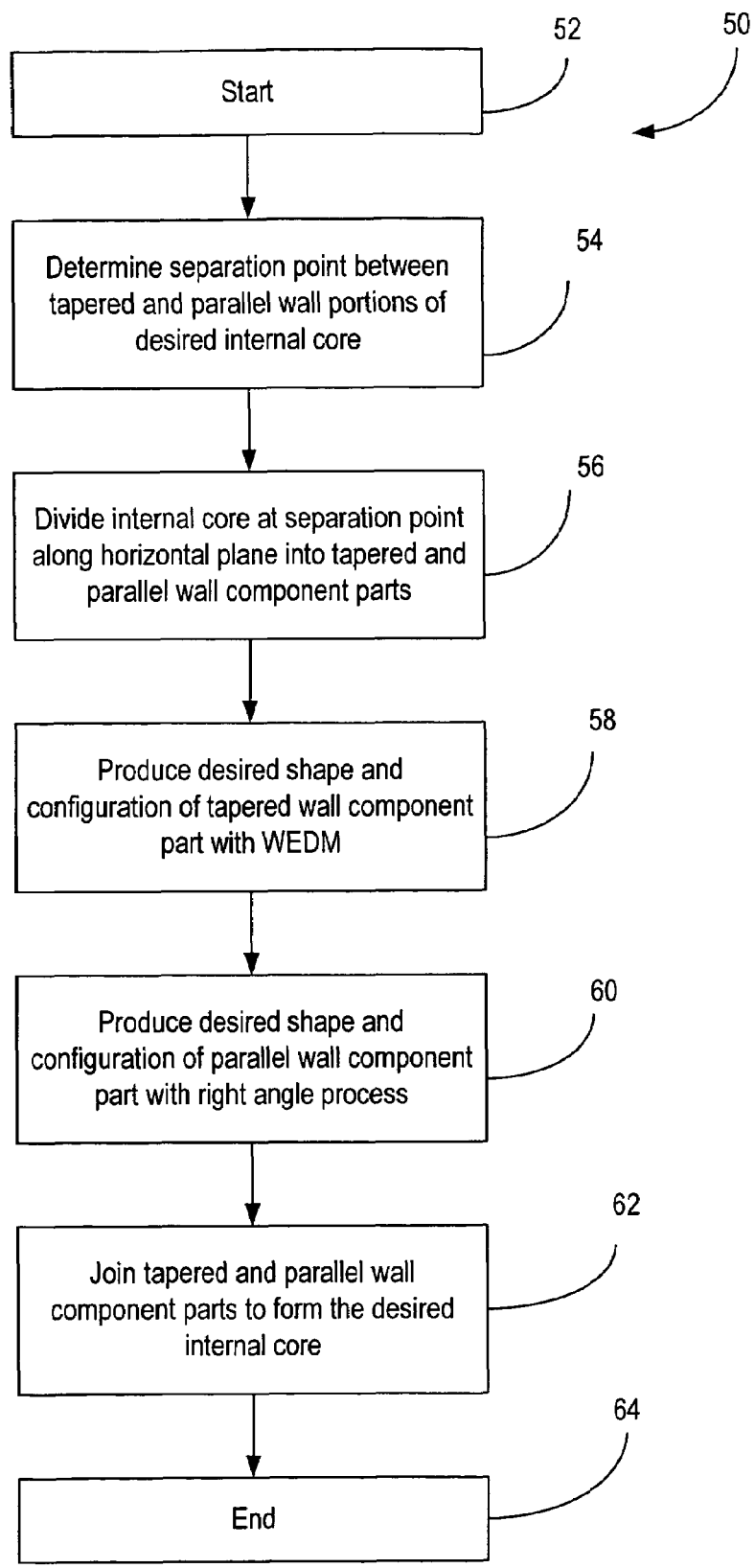
FIG. 5 is a flowchart showing the major functional steps for manufacturing an internal core embodying the present invention.

Turing to FIG. 5, an exemplary flowchart showing the major functional steps for manufacturing an internal core embodying the present invention is illustrated therein and generally designated 50. The process begins at the start step 52 and moves to step 54 where the separation point between the tapered wall portion and the parallel wall portion of the desired internal core to be manufactured is determined. Once the separation point is determined the process moves to step 56 and the internal core is divided at the separation point along a horizontal plane into a tapered wall component part and a parallel wall component part. The tapered wall component part is made into the desired shape and configuration in step 58 using a WEDM manufacturing process. The parallel wall component part is made into the desired shape and configuration in step 60 using a suitable right angle manufacturing process such as a right angle milling process or a WEDM with a right angle manufacturing process. Steps 58 and 60 can be carried out substantially at the same time since there are two individual component parts that are being formed and thus a timesavings can be realized. Once the tapered wall component part and parallel wall component part are manufactured, the parts are joined together in step 62 using any suitable attachment method to form the desired internal core ending the process at step 64.

An internal core for an injection mold tool has been disclosed above in an exemplary embodiment. It is understood by those skilled in the art that numerous changes and modifications may be made without departing from the spirit and scope of the invention for example, other manufacturing processes than the WEDM and EDM may be utilized to manufacture and configure the tapered wall component part and parallel wall component part. Accordingly, the invention has been disclosed by way of illustration rather than limitation.

The invention claimed is:

1. Method, comprising:
   manufacturing an internal core for an injection mold tool wherein the profile of the internal core has a tapered wall portion and a parallel wall portion;
   determining a delineation line separating the tapered wall portion from the parallel wall portion for separating the internal core into a tapered wall component part and a parallel wall component part;
   separating the internal core into a tapered wall component part and a parallel wall component part;
   manufacturing the external surface of the tapered wall component part using a wire electric discharge machining manufacturing process to produce the desired shape and configuration;
   manufacturing the external surface of the parallel wall component part, simultaneously with the manufacturing of the tapered wall component, using a right angle manufacturing process to produce the desired shape and configuration; and
   joining the tapered wall component part and the parallel wall component part to form the internal core.

2. The method as defined in claim 1 wherein said delineation line is along a horizontal plane separating the tapered wall portion and the parallel wall portion.

3. The method as defined in claim 1 wherein the right angle manufacturing process is a milling process.

4. The method as defined in claim 1 wherein the right angle manufacturing process is a wire electric discharge machining process with a right angle.

5. The method as defined in claim 1 wherein the tapered wall and parallel wall component parts are joined together with screws.

6. The method as defined in claim 5 wherein the tapered wall and parallel wall component parts are aligned prior to joining.

7. The method as defined in claim 6 wherein the tapered wall and parallel wall component parts are configured with alignment pins.

8. Method, comprising:
   profiling an injection mold tool internal core with a tapered wall portion and a parallel wall portion;
   separating the internal core into a tapered wall component part and a parallel wall component part along a determined delineation line separating the tapered wall portion from the parallel wall portion;
   producing a desired shaped and configured external surface of the tapered wall component part;
   producing a desired shaped and configured external surface of the parallel wall component part, simultaneously with the producing of the desired shaped and configured tapered wall component; and
   forming the injection mold tool internal core by joining the tapered wall component part to the parallel wall component part.

* * * * *